Oct. 20, 1931.  G. KLINTWORTH  1,828,714
TIRE CHAIN KEEPER
Filed Sept. 25, 1930
Fig.1.
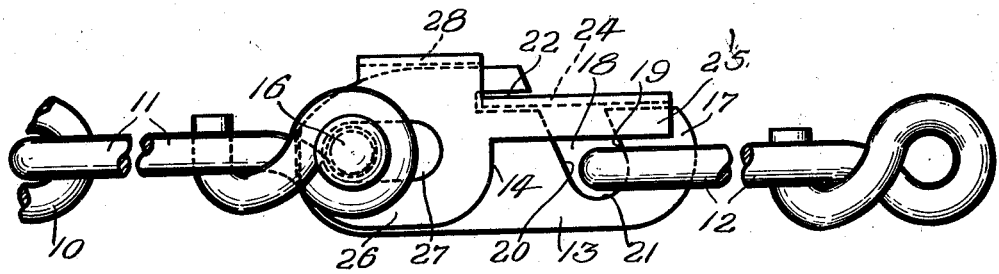
Fig.2.
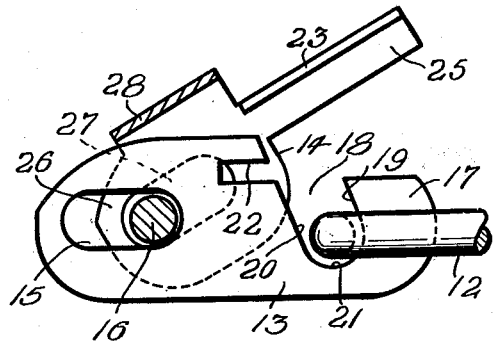
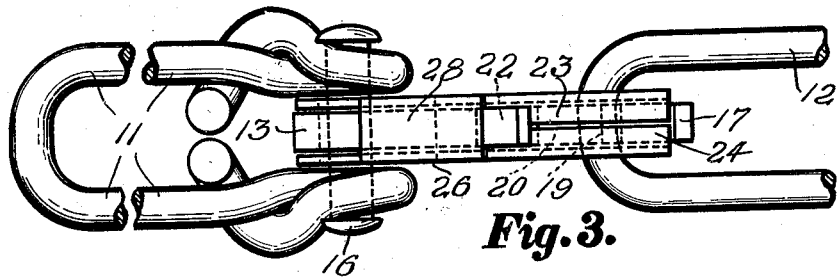
Fig.3.
Fig.4.
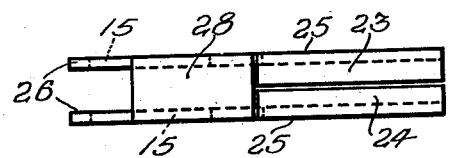
Inventor
*Glen Klintworth*
By *Arthur H. Sturges.*
Attorney Patented Oct. 20, 1931

1,828,714

UNITED STATES PATENT OFFICE

GLEN KLINTWORTH, OF SCRIBNER, NEBRASKA

TIRE CHAIN KEEPER

Application filed September 25, 1930. Serial No. 484,401.

The present invention relates to improvements in tire chain keepers, and has for an object to provide an improved keeper for securing together the ends of side chains which are employed to hold therebetween the cross chains of anti-skid devices for automobiles.

It is another object of the invention to provide a positively locking clip, detent or keeper so constructed as to prevent its accidental opening or release, which is attended, with the standard types of these devices, with the release and the loss of the anti-skid chains.

A further object of the invention is to provide an improved tire chain keeper in which the ends of the chain may be securely held together at high speed of the vehicle and when the chain is subjected to rough usage.

A still further object of the invention resides in providing an improved tire chain keeper which may be economically constructed with great strength and durability and wherein the locking part will not be apt to work loose because of the chain becoming slack.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side view of an improved tire chain keeper constructed in accordance with the present invention and shown in the locked position with fragments of the ends of the side chain also illustrated.

Figure 2 shows a longitudinal section through the improved device in the open position and indicating one link of the chain broken away.

Figure 3 shows a top plan view of the device in the closed position as applied to the end links of a tire chain, and Figure 4 is a top plan view of the locking element taken separately.

Referring more particularly to the drawings, a chain, such as the side chain of an automobile anti-skid device, is shown at 10, such side chains being adapted, in the usual manner, to be connected to cross chains which span the tread of the tire.

The ends of the side chains terminate in links 11 and 12 of any appropriate form. Quite usually these links are secured in a clip of well known construction having a pivoted frictionally held keeper adapted to interlock the link 12 in a hook of the clip.

The improved clip, according to the present invention, consists of a plate 13 and a keeper or locking member 14. The plate 13 is provided at one end with an elongated slot 15 adapted to slidably receive therethrough a transverse pin 16 carried by one end link 11 of the chain 10. The slot 15 in the plate 13 extends as to its major axis in line with the length of the chain 10 so that due to differences in inflation in the tire and to the compression of the tire as it rotates and receives the weight of the car, the pin 16, which is rigidly carried by the chain, may move back and forth in the elongated slot 15 without causing the fastening device to cant sidewise or to tilt longitudinally, which action is often accompanied in the present forms of clips with the escape of the link 12 from the hook 17 which is formed at the opposite end of the plate 13.

This hook is provided beyond a recess 18 having a forward diagonal wall 19 and a rear diagonal wall 20. The recess 18 is open through the top of the plate 13 and through both sides thereof, but is closed at its bottom, preferably by the curved wall 21 which may conform in general to the cross sectional curvature of the link 12. In this manner a pocket is formed at the base of the forward wall 19, making it necessary if the link 12 is to escape from this pocket to ride up the upwardly and rearwardly inclined wall 19.

Extending in a plane above the hook 17 and slot 15 is a notch 22 closed at its forward end and open at its rear end and at its sides. This notch 22 is adapted to receive the wings 23 and 24 of the keeper member 14. Such wings constitute substantially strong angle iron constructions, the side walls or vertical webs of which are indicated at 25 and which act to embrace the sides of the plate 13 when the keeper is in a lowered closed position, as shown in Figure 1.

These webs 25 merge at their forward ends with side plates 26 of the keeper, such side plates being adapted to embrace opposite sides of the plate 13. In the side plates 26 are elongated slots 27 of a form and character substantially identical with the slot 15 with which they are adapted to register when in the closed locked position shown in Figure 1.

A bridge or connected piece 28 is also preferably a part of the keeper member in order to secure the two side plates 26 together.

In the use of the device, the parts are shown in the open position in Figure 2. One end of the chain involving the link 11 is permanently connected to the improved clip device through the pin 16 and the pin and its chain have therefore a relative movement with respect to the plate 13 and the keeper member 14 also has a relative movement both with respect to the plate 13 and the pin 16.

In the open position of the parts shown in Figure 2, the link 12 of the chain may be freely slipped over the hook 17 and into the socket 18 in which it will remain engaged by reason of the tautness of the side chain 10 aided by the locking keeper 14. After the link 12 has been placed in the socket 18, the keeper member 14 is lowered to a position where the wings 23 and 24 will strike the upper edge of the plate 13. Thereupon the keeper 14 is moved longitudinally toward the chain link 11, causing the wings 23 and 24 to enter the notch 22, the overhanging upper wall of which will prevent the keeper from pivoting upwardly about the pin 16. The link 12 will thus be held fast in the hook 17.

Of course the keeper may be made of some resilient material, for instance sheet metal, and the side walls of this keeper may have a frictional clamping engagement with the side walls of the plate 13. This will assist to avoid any casual working of the keeper member longitudinally along the plate 13 to a position where the wings 23 and 24 might escape from the notch 22. However, the pin 16 will tend, by the very tautness of the side chain 10, to hold the keeper member in the interlocked condition. When the chain buckles or tends to contract, the pins 16 may move along in the slots 15 and 27 without pushing the keeper out of interlocked position.

The function of the wings 23 and 24 is to extend over the mouth of the socket 18 so that when the chain 10 is relaxed there is no tendency of the link 13 to move out from beneath the keeper and thus become disengaged or released.

When it is desired to release the chain for removing the tire chain or the like, it is only necessary to move the keeper member outwardly and then upwardly by manual manipulation.

It is obvious that various changes and modifications may be made in the details of construction and design of the above specifically described embodiment of this invention without departing from the spirit thereof, such changes and modifications being restricted only by the scope of the following claims.

What is claimed is:—

1. An improved clip comprising a plate having an elongated slot at one end and a hook at the other end with a notch extending above and between said slot and hook, and a slotted keeper pivotally and slidably mounted upon said plate and having wings extending therefrom adapted to extend over said hook and into said notch.

2. An improved clip comprising a plate having a slot at one end, a hook at the other end and a notch therebetween, a keeper having slotted side plates for alinement with the slot in the plate, a bridge connecting said side walls, and wings extending off said side walls and adapted to extend in and out of said notch and over the hook.

3. An improved clip comprising a plate having a slot at one end, a hook at the other end and a notch in the intermediate portion thereof, a keeper having side walls for embracing the sides of the plate, said side walls having elongated slots for registering with the slot of the plate, a chain link having a pin slidably mounted through said slots, a bridge piece connecting said side plates, wings extending from said side plates and adapted to extend over said hook and into and out of said notch, and angle webs on said wings.

4. An improved clip comprising a plate having a slot, a hook and a notch, a slotted keeper pivotally and slidably mounted upon said plate and having wings extending therefrom adapted to extend over said hood and into said notch.

In testimony whereof, I have affixed my signature.

GLEN KLINTWORTH.